Patented Nov. 13, 1934

1,980,943

UNITED STATES PATENT OFFICE 1,980,943

MANUFACTURE OF RUBBER GOODS

Philip Dobson Patterson, Moseley, England, assignor to Dunlop Rubber Company Limited, a British corporation No Drawing. Application January 6, 1931, Serial No. 506,972. In Great Britain January 13, 1930

4 Claims. (Cl. 106—23)

This invention comprises improvements in or relating to the manufacture of goods of rubber or similar material and is particularly concerned with the production of finely divided or powdery compositions of rubber.

The object of the invention is to produce finely divided or powdery compositions of rubber inexpensively and in a vulcanized or unvulcanized condition, particularly suitable for moulding purposes and as compounding ingredients.

According to the invention the finely divided or powdery compositions of rubber are produced from substances such as rubber reclaim, waste or coagulated rubber, synthetic rubber, thermoplastic derivatives of rubber or the like used as alternatives or admixtures, which are hereinafter generically designated as rubber material, wherein the aforesaid substances are first dispersed under such conditions as to produce aqueous emulsions or dispersions of the aforesaid substances and the emulsions or dispersions thus produced are subsequently coagulated while being subjected to agitation during the addition of coagulating agents. The aforesaid substances may also have admixed therein such substances as synthetic resins and bitumen.

Artifically prepared aqueous emulsions or dispersions containing large proportions of reclaim give particularly favourable results. The presence in the artificially produced aqueous emulsions or dispersions of dry powders such as china clay and/or whiting which tends to "buffer" the crumb-like particles produced also improves the finely divided or powdery compositions obtained.

The coagulants found to be particularly suitable for the carrying out of this invention are lead salts, for example, lead acetate, lead thiosulphate and lead chloride. Other coagulants as, for example, sodium silicofluoride can also be used. The degree of concentration of the artificially prepared aqueous dispersions, i. e. the amount of water added before the addition of the coagulating agents has also been found to be of importance. Too much water tends to produce a thick sludge instead of the discrete particles desired. Too little water tends to produce a comparatively non-friable continuous mass with the ultimate formation of large lumps.

In one embodiment of the invention whole tyre rubber reclaim and sulphur together with suitable fillers and compounding ingredients, for example, finely divided fibres and wood flour are dispersed in a suitable type of internal mixer in the presence of water and suitable dispersing agents. If desired, an aqueous dispersion of rubber, e. g. latex, may be added at this stage of the operations.

Dry powders such as china clay and/or whiting are then added to the dispersion produced which now has the appearance of a smooth paste containing the dispersed whole tyre rubber reclaim, fillers and compounding ingredients.

This paste is then coagulated in a suitable type of mixing machine by the addition of such coagulating agents as lead chloride while the dispersion is undergoing agitation. Within a short period the dispersion is converted into a fine crumb.

The type of blade employed in the internal mixer is important and should be a compromise between the masticating and the agitating type. It is undesirable that the blades should exert too great a grinding or rupturing effect on the rubber, as although this would be advantageous from a mixing point of view the action would tend to aggregate the fine crumbly coagulum when this is produced. On the other hand, a purely agitative type of blade should not be used as considerable difficulty would be initially experienced in efficiently mixing the ingredients before inversion.

The following is given by way of example as to how the process can be effected:—

To produce a cheap ebonite powder for the production of battery boxes, switch covers and other like moulded articles the following ingredients are first made into a uniform plastic mass in an internal mixer:—

|  | Parts by weight |
|---|---|
| Whole tyre rubber reclaim | 95.0 |
| Sulphur | 50.0 |
| Bituminous residues | 15.0 |
| Colophony resin | 10.0 |

This mixture is then dispersed by any known process by the addition of dispersing agents such as colloidal clay, gums, glue, soaps, alkalis, or in the presence of soap-forming ingredients.

After the mixture has been properly dispersed sufficient water is added to bring the concentration to 70% to 75% and then 5 parts of rubber in the form of concentrated or unconcentrated rubber latex are introduced. 25 parts of dry china clay are then added and when a uniform mixture has been obtained 4 parts of lead chloride in solution in water or as a fine powder are admixed with the rubber dispersion while undergoing agitation. In about 10 minutes the batch will thicken and if the agitation is continued the mixture will gradually break up and form a fine crumbly mass. The agitation or stirring should be continued until maximum fineness is obtained, although if carried too far the crumb will tend to aggregate. Should this aggregation tend to take place it can be prevented by the addition of a little water which will reduce the surface stickiness of the particles and prevent their coalescing.

The crumb is spread out on trays and dried in a current of air at about 40° C. It is then sifted through suitable sieves. For most purposes a 20-mesh sieve is convenient and with this there should normally be a residue of not more than 10%. If desired, this residue can be again dispersed with the next batch of dispersion to be made.

If it is desired to vulcanize the crumb thus obtained this can be effected by curing in steam. A 60 lbs. pressure for 1¾ hours has been found to be sufficient for this purpose. Should any caking occur during cure this can be easily removed by gently frictioning the cured powder.

Having now particularly described and ascertained the nature of my said invention and in what manner the same is to be performed I declare that what I claim is:—

1. A process for the manufacture of finely divided compositions of rubber or similar material which comprises forming a mixed dispersion of an aqueous artificial dispersion of rubber and latex in a proportion of at least two of the former to one of the latter calculated on the rubber content and of insoluble inert inorganic materials in dry powdered form and in quantity greater than the latex rubber content of said mixed dispersion, and coagulating the dispersion by a coagulating agent of the class consisting of the water soluble salts of lead and alkali silicofluorides while agitating and at a concentration to produce crumb-like particles containing inorganic materials.

2. A process for the manufacture of finely divided compositions of rubber or similar material which comprises forming a mixed dispersion of an aqueous artificial dispersion of rubber and latex in a proportion of at least two of the former to one of the latter calculated on the rubber content and of insoluble inert inorganic materials in dry powdered form and in quantity greater than the latex rubber content of said mixed dispersion, and coagulating the dispersion by a coagulating agent of the class consisting of the soluble salts of lead and the alkali silicofluorides while agitating and at a concentration of between 70 to 75% solids to produce crumb-like particles containing inorganic materials.

3. A process for the manufacture of molded compositions of rubber material which comprises forming a mixed dispersion of an aqueous artificial dispersion of rubber material and latex in a proportion of at least two of the former to one of the latter calculated on the rubber content and of insoluble inert inorganic materials in dry powdered form and in quantity greater than the latex rubber content of said mixed dispersion, coagulating the dispersion by a coagulating agent of the class consisting of the soluble salts of lead and the alkali silicofluorides while agitating and at a concentration to produce crumb-like particles containing inorganic materials, and drying and sieving said particles and compacting them under pressure.

4. The process of claim 1 in which said inorganic materials are of the class consisting of china clay and whiting.

PHILIP DOBSON PATTERSON.